United States Patent [19]

Kirbach

[11] Patent Number: 4,977,802
[45] Date of Patent: Dec. 18, 1990

[54] SELF ALIGNING GUIDES FOR CIRCULAR SAWS

[76] Inventor: Eberhard Kirbach, 10260 Dennis Crescent, Richmond, British Columbia, Canada, V7A 3R8

[21] Appl. No.: 391,084

[22] Filed: Aug. 9, 1989

[51] Int. Cl.$^5$ .................... B27B 5/34; B27B 11/02
[52] U.S. Cl. ...................................... 83/13; 83/425.4; 83/508.3; 83/823
[58] Field of Search ............... 83/425.4, 425.3, 498, 83/504, 507, 508.2, 508.3, 820, 821, 446, 823, 499, 824, 13

[56] References Cited

U.S. PATENT DOCUMENTS

| | | | |
|---|---|---|---|
| 189,416 | 4/1877 | Baker | 83/829 |
| 381,423 | 4/1888 | Robinson | 83/829 |
| 431,483 | 7/1890 | Roe | 83/42.54 |
| 969,810 | 9/1910 | Skeith | 83/42.54 |
| 1,734,887 | 11/1929 | Thomas | 83/425.4 |
| 1,744,499 | 1/1930 | Pelton | 83/425.4 |
| 1,835,041 | 12/1931 | Hagmaier et al. | 83/425.4 |
| 1,921,569 | 8/1933 | Hortkotte | 83/425.4 X |
| 2,694,420 | 11/1954 | Musser | 83/425.4 |
| 2,696,253 | 12/1954 | Hartman | 83/829 |
| 3,003,531 | 10/1961 | Niebuhr | 83/829 |
| 3,285,302 | 11/1966 | Thrasher | 83/829 |
| 4,540,394 | 9/1985 | Cavagna | 83/504 |
| 4,599,929 | 7/1986 | Dutina | 83/821 |
| 4,649,782 | 3/1987 | Cavagna | 83/425.4 |

Primary Examiner—Douglas D. Watts
Assistant Examiner—Kenneth E. Peterson
Attorney, Agent, or Firm—Shlesinger & Myers

[57] ABSTRACT

A self aligning guide system for one or more circular saw blades allows the guides to be aligned while the saws are rotating at operating speed under no load. The system includes at least one saw blade mounted on a shaft and has a first guide block having a face engageable with one side face of the saw blade and a second guide block with a face engageable with the other side face of the saw blade, a guide housing containing the first and second guide blocks, the guide housing slidingly mounted on an elongate member substantially parallel to the saw blade shaft, clamp means to clamp and unclamp the guide housing on the elongate member, and remote operational means to effect the clamping and unclamping of the guide block on the elongate member.

10 Claims, 1 Drawing Sheet

U.S. Patent
Dec. 18, 1990
4,977,802
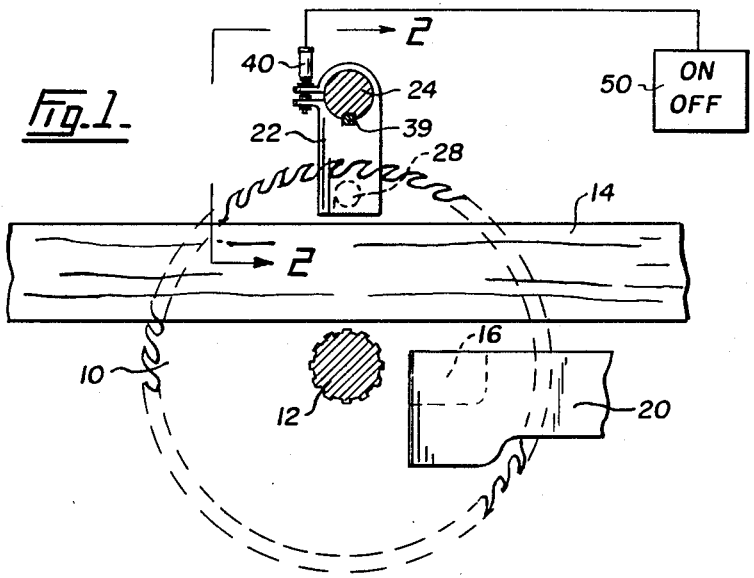
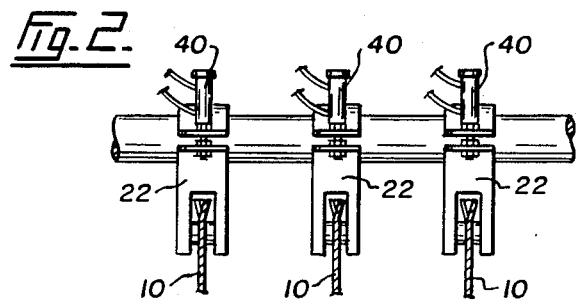
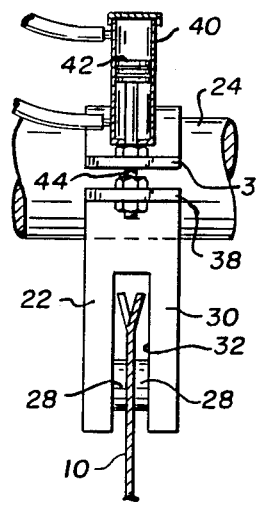
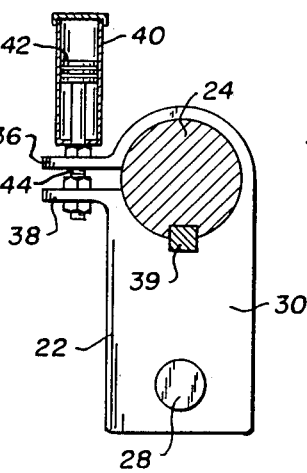
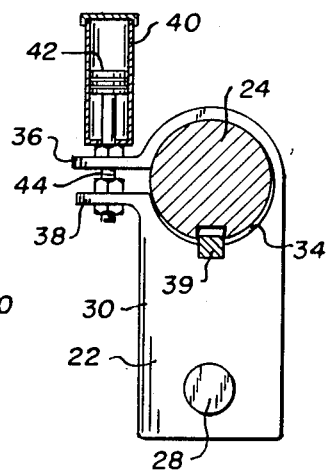

SELF ALIGNING GUIDES FOR CIRCULAR SAWS

BACKGROUND OF THE INVENTION

The present invention relates to circular sawing systems in lumber mills, and more specifically to improvements in cutting performance of circular saws to provide improved lumber tolerances.

The cutting performance of circular rip saws has been improved dramatically in recent years due to the introduction of guides which provide the circular saw with lateral support to prevent or reduce deflection while sawing. Almost all circular saw guides employed in industrial operations are single guide blocks which support the saw blade either above or below the work piece. The support of the saw blade can be further increased by using double or triple guide systems. The benefits of multiple guides over single guides have been demonstrated theoretically, however the attempts to develop multiple guide systems and their implementation has not been as successful as expected. Alternatively the alignment of multiple guides has proved to be difficult.

One example of a type of circular saw blade guide and vibration damper is disclosed in my co-pending application Ser. No. 143,190. Now U.S. Pat. No. 4,854,207 housing with guide block specifically mounted to engage both faces of a saw blade. The guide blocks are resiliently biased against stops by pneumatic pressure to guide and dampen any vibration that occurs in the saw blade.

In standard gang edger operations it is found that when saw blades are either stationary or below operational speed, they may not be flat due to tensioning of the saw blade which is applied by rolling or hammering with the purpose of increasing the stiffness of the blade. This is specifically true for thin blades which deflect more easily.

At present, stationary double or triple guides are aligned manually and generally while the saw blades are not rotating. Thus a saw blade that is not flat gives a slight misalignment and this is detrimental to the cutting accuracy of the blade. Furthermore misalignment produces side forces which add to the lateral forces generated by the work piece and this again results in inaccuracies in the cutting.

SUMMARY OF THE INVENTION

It is an aim of the present invention to improve the cutting performance of circular saws when used in a lumber mill and improve the tolerances in the lumber cut by a circular saw and particularly when there are a plurality of saw blades arranged on a single shaft in a gang saw arrangement so that the spacing between the saw blades is maintained during the sawing step.

It is a further aim of the present invention to provide a self aligning guide system that is aligned remotely when the saw blade is idling at full operational speed and then locked or clamped in the aligned position prior to sawing.

The present invention provides a mounting and alignment system for a second and in some cases a third guide beyond a first fixed support guide for a circular saw blade.

The present invention provides a circular sawing system including at least one blade mounted on a shaft, comprising a first guide block having a face engageable with one side face of the saw blade and a second guide block with a face engageable with the other side face of the saw blade, a guide housing containing the first and second guide blocks, the guide housing slidingly mounted on an elongated member substantially parallel to the saw blade shaft, clamp means to clamp and unclamp the guide housing on hte elongate member, and remote operational means to effect the clamping and unclamping of the guide block of the elongate member.

In further embodiment there is provided a method aligning at least one guide with at least one circular saw blade for sawing lumber, wherein a guide housing contains a first guide block for engaging one side face of the saw blade, and a second guide block for engaging the other side face of the saw blade, the guide housing slidingly mounted on an elongate member substantially parallel to the circular saw blade axis of rotation comprising the steps of permitting the guide housing to slide freely on the elongate member, rotating the saw blade under no load at a desired sawing speed and remotely clamping the guide housing to the elongate member before commencing to saw lumber.

BRIEF DESCRIPTION OF THE DRAWINGS

In drawings which illustrate embodiments of the invention,

FIG. 1 is a side view showing a saw blade with a work piece being sawn and a self aligning guide according to one embodiment of the invention.

FIG. 2 is a section taken at line 2—2 of FIG. 1.

FIG. 3 is a partial end view showing a saw guide mounted on a mounting rod according to one embodiment of the invention.

FIG. 4 is a partial side view of the saw guide shown in FIG. 3 clamped on a mounting rod.

FIG. 5 is a partial side view of the saw guide shown in FIG. 3 unclamped and in a sliding position on a mounting rod.

DETAILED DESCRIPTION OF THE PREFERRED EMBODIMENT

FIGS. 1 and 2 illustrate three saw blades 10 mounted on shaft 12. The shaft 12 is a power shaft to rotate the saws during the cutting step. A work piece 14, is shown passing through the saw blades 10 nd being sawn into separate lumber pieces. On the lower half of the saw blades 10 is a pair of guide pads 16 attached to a guide arm 20 which forms part of the structure of the saw machine. The guide pads 16 may be of the fixed pad type with lubrication to avoid excessive heat build up, or of the floating type. Above the work piece 14 is a self aligning guide 22 positioned on a mounting rod 24 which is substantially parallel to the saw blade shaft 12.

FIG. 1 illustrates the work piece 14 passing over the top of the saw blade shaft 12. In another embodiment, the workpiece 14 can pads below the shaft 12, in which case the guide arm 20 and pair of guide pads 16 are positioned above the shaft 12 and the self aligning guide 22 is positioned below the work piece 14.

Referring now to FIGS. 3, 4, and 5 the self aligning guide 22 has a first and second guide block 28 positioned on each side of the saw blade 10 below the saw teeth. The guide blocks 28 are supported by a housing 30 having a slot 32 therein for the saw blade 10. The guide housing 30 has a circular hole 34 with a top clamp arm 36 and a bottom clamp arm 38. A key or pin 39 on the housing slides in a keyway at the bottom of the mounting rod 24, prevents the housing 30 rotating about the mounting rod 24. Whereas a cylindrical mounting rod 24 is shown in the drawings, it is apparent that a square, rectangular or other shaped rod may be used that does not permit the housing 30 to rotate on the rod 24. A small cylinder 40 is mounted on top of the top clamp arm 36 and a piston 42 reciprocates within the cylinder 40 which has a shaft 44 connected to the bottom clamp arm 38. The operation of the piston 42 within the cylinder 40 may be pneumatic, hydraulic or alternatively replaced by an electric solenoid arrangement. FIG. 4 shows the two clamp arms 36 and 38 pulled together by the piston 42 in the cylinder 40 so that the housing 30 is firmly clamped to the mounting rod 24. FIG. 5 illustrates the situation where the piston 42 drops in the cylinder, the two clamp arms 36 and 38 open to provide space so that the housing 30 can easily slide backwards and forwards on the mounting rod 24.

The guide blocks 20 are preferably of the fixed pad type and are lubricated to avoid heating the blade. In another embodiment floating type guides may be used.

In operation it is necessary to position the saw blades 10 on the shaft 12 by means of spacers and other well known arrangements so that the space between the saw blades 10 is in accordance with the size of lumber required. The mounting arms 20 supporting the pair of pads 16 are positioned and fixed in place in accordance with the desired spacing between the saw blades 10. The self aligning guide assemblies 22 are shown positioned on the top half of the saw blade 10, and, as can be seen in the preferred embodiment, the mounting rod 24 is directly above the saw blade shaft 12. In another embodiment, the guide assmeblies 22 are positioned on the lower half of the saw blade 10. The guide blocks 28 are also positioned directly above the saw blade shaft 12. A remote control on/off valve or switch 50, as illustrated schematically in FIG. 1, provides a control of the cylinder 40. Initially the guide 22 is arranged to be in the sliding position as shown in FIG. 5 with the clamp mechanism off. The saw blades 10 are rotated at the full operational speed but no work pieces are applied. The saw blades only idle and the guide assemblies are allowed to find their positions on the mounting rod 24. Once the position of the guides 22 has stabilized an operator remotely powers the cylinders 40 so that all the saw guide housings 30 are clamped to the mounting rod 24. The sawing system is then ready for sawing and when the work pieces are fed to the saw blades 10 the saw guides 22 retain the position of the saw blades 10. The guides are all accurately aligned and provide a balanced support to the saw blade.

The position of the saw blade guides 22 is not changed until the saws are changed for sharpening and tensioning. In shifting gang edgers wherein the saw blades are continuously repositioned, the saw blade guides 22 are unclamped and moved then clamped again with the saw blades idling at the full operational speed.

The saw blade guides 22 are light in weight to allow the saw blade to easily move the guide when rotating at the operational speed. Whereas only one self aligning guide is shown in FIG. 1. Another self aligning guide may be provided beneath the work piece 14 on the other side of the saw blade 10 from the fixed guide pads 16.

Various changes may be made to the embodiments shown herein without departing from the scope of the present invention which is limited only by the following claims.

The embodiments of the present invention in which an exclusive property or privilege is claimed are defined as follows:

1. A circular sawing system including at least one saw blade mounted on a shaft, with a positionable saw blade guide located on one portion of the saw blade, and a floating saw blade guide means located on another portion of the saw blade, the floating saw blade guide means comprising:
   a first guide block having a face engageable with one side face of the saw blade and a second guide block with a face engageable with the other side face of the saw blade,
   a guide housing containing the first and second guide blocks, the guide housing slidingly mounted on an elongate member substantially parallel to the saw blade shaft,
   clamp means for unclamping the guide housing from the elongate member thereby permitting the saw blade to move the guide housing and for clamping the guide housing on the elongate member after initial rotation of the saw blade, and
   operational means to affect the clamping and unclamping of the guide block on the elongate member.

2. The circular sawing system according to claim 1 including a plurality of saw blades spaced apart on the saw blade shaft and wherein the floating saw blade guide comprises a guide housing for each saw blade, each guide housing slidingly mounted on the elongate member.

3. The circular sawing system according to claim 1 wherein the clamp means comprises a piston and cylinder attached to one of two clamp arms surrounded the elongate member, such that activation of the piston in the cylinder, clamps and unclamps the guide block on the elongate member.

4. The circular sawing system according to claim 3 wherein the piston and cylinder are operated hydraulically by remote valve means.

5. The circular sawing system according to claim 3 wherein the piston and cylinder are operated pneumatically by remote valve means.

6. The circular sawing system according to claim 3 wherein the piston and cylinder are operated with a solenoid by remote switch means.

7. The circular sawing system according to claim 3 wherein the elongate member is a cylindrical mounting rod.

8. The circular sawing system according to claim 1 wherein a work piece is sawn at the top half of the saw blade, and the guide housing is positioned at the top of the saw blade above the location on the saw blade where the work piece is sawn.

9. The circular sawing system according to claim 8 wherein the guide housing is positioned directly above the saw blade shaft.

10. A method of aligning at least one floating saw blade guide with at least one circular saw blade for sawing lumber, the circular saw blade having a positionable saw blade guide, wherein a guide housing of the floating saw blade guide contains a first guide block for engaging one side face of the saw blade, and a second guide block for engaging the other side face of the saw blade, the guide housing slidingly mounted on an elongate member substantially parallel to the circular saw blade axis of rotation comprising the steps of:

permitting the guide housing to slide freely on the elongate member upon initial rotation of the saw blade thereby permitting the saw blade to move the guide housing;

rotating the saw blade under no load at a desired sawing speed, and remotely clamping the guide housing to the elongate member after initially rotating the saw blade and before commencing to saw lumber.

* * * * *